(12) United States Patent
Tatsuda

(10) Patent No.: US 8,657,541 B2
(45) Date of Patent: Feb. 25, 2014

(54) SPINDLE HEAD FOR MACHINE TOOL

(75) Inventor: Yoshinori Tatsuda, Kanazawa (JP)

(73) Assignee: Tsudakoma Kogyo Kabushiki Kaisha, Kanazawa-shi (JP)

( * ) Notice: Subject to any disclaimer, the term of this patent is extended or adjusted under 35 U.S.C. 154(b) by 1111 days.

(21) Appl. No.: 12/663,984

(22) PCT Filed: Jul. 1, 2008

(86) PCT No.: PCT/JP2008/061889
§ 371 (c)(1),
(2), (4) Date: Dec. 10, 2009

(87) PCT Pub. No.: WO2009/008285
PCT Pub. Date: Jan. 15, 2009

(65) Prior Publication Data
US 2010/0170372 A1    Jul. 8, 2010

(30) Foreign Application Priority Data

Jul. 12, 2007 (JP) ................................. 2007-183142

(51) Int. Cl.
*B23C 1/12* (2006.01)
*B23Q 1/54* (2006.01)

(52) U.S. Cl.
USPC .......................................... 409/201; 409/211

(58) Field of Classification Search
USPC .......................................... 409/201, 211, 216
IPC ..................................... B23C 1/12; B23Q 1/54
See application file for complete search history.

(56) References Cited

U.S. PATENT DOCUMENTS 4,893,532 A  *  1/1990  Walburn et al. ................. 82/148
5,064,322 A     11/1991  Pisani et al.
(Continued)

FOREIGN PATENT DOCUMENTS

DE   102005026152 B3  *  7/2006
JP         64-9033 U        1/1989
(Continued)

OTHER PUBLICATIONS

Machine translation of DE 102005026152 B3, obtained from the EPO website in Sep. 2013.*

(Continued)

*Primary Examiner* — Daniel Howell
(74) *Attorney, Agent, or Firm* — Westerman, Hattori, Daniels & Adrian, LLP

(57) ABSTRACT

In a spindle head for a machine tool in which a spindle (10) to which a tool is mounted is rotated around an axial line of a support shaft (58, 59), two rotating members (9, 58) that form a rotation transmission mechanism for rotating the spindle (10) and that transmit drive force of the rotation driving device (56) are fastened to each other at respective connection sections thereof by a bolt group (301) and are connected to each other so as to be prevented from rotating relative to each other by friction force resulting from the fastening. Rotation prevention torque based on the friction force is a value greater than torque applied to the connection sections during processing and smaller than torque applied to the connection sections when external force that causes the spindle (10) to deform beyond a permissible range is applied to the spindle (10). Therefore, even if the tool or the spindle (10) collides with, for example, a processing tool, the spindle (10) does not become deformed beyond the permissible range.

9 Claims, 7 Drawing Sheets

(56) References Cited

U.S. PATENT DOCUMENTS

| | | | |
|---|---|---|---|
| 5,584,621 A * | 12/1996 | Bertsche et al. | 409/201 |
| 5,664,308 A | 9/1997 | Deitert | |
| 5,758,399 A | 6/1998 | Sahm et al. | |
| 6,122,808 A * | 9/2000 | Popp | 29/49 |
| 6,332,386 B1 * | 12/2001 | Popp | 82/142 |
| 6,785,943 B2 * | 9/2004 | Sheehan et al. | 29/40 |
| 6,825,630 B2 * | 11/2004 | Katoh et al. | 318/560 |
| 2007/0059116 A1 * | 3/2007 | Brunemann | 409/201 |

FOREIGN PATENT DOCUMENTS

| | | | |
|---|---|---|---|
| JP | 2-185339 A | | 7/1990 |
| JP | 03178709 A | * | 8/1991 |
| JP | 2003-048135 A | | 2/2003 |
| JP | 3761230 B2 | | 3/2006 |

OTHER PUBLICATIONS

Extended European Search Report dated Jan. 4, 2013, issued in corresponding European patent application No. 08777740.5.

International Search Report of PCT/JP2008/061889, mailing date of Sep. 9, 2008.

* cited by examiner

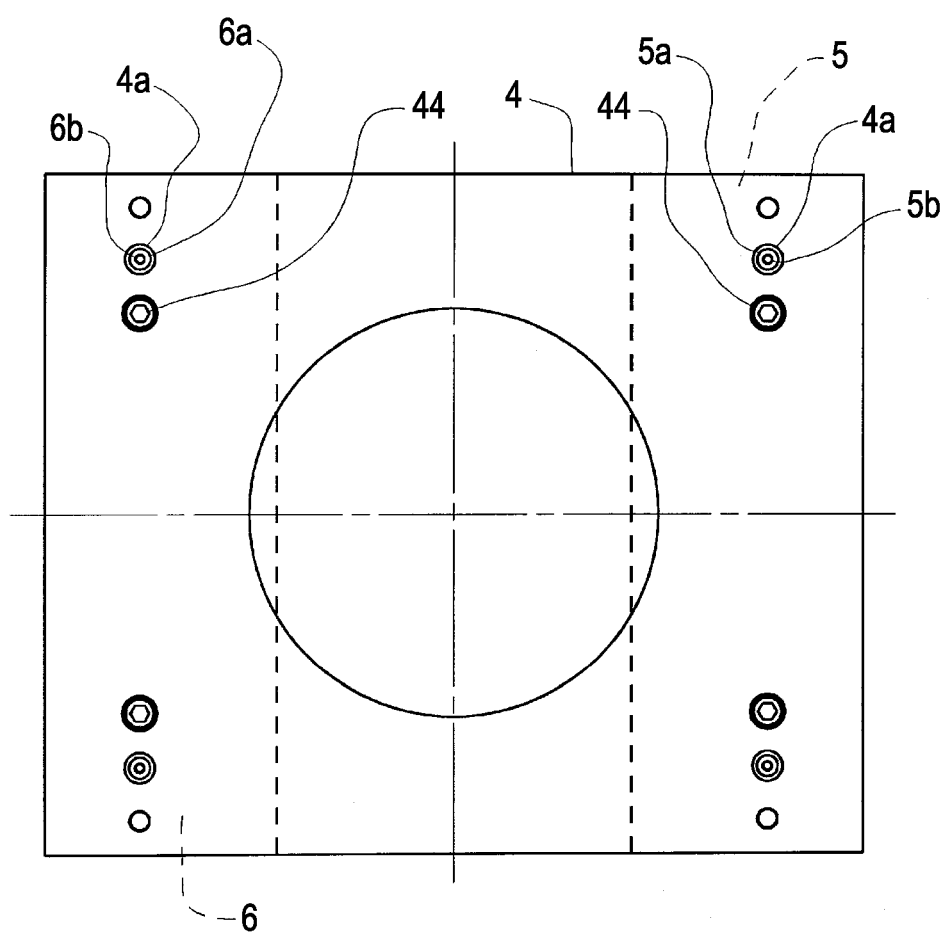

SPINDLE HEAD FOR MACHINE TOOL

TECHNICAL FIELD

The present invention relates to a technology related to a spindle head mounted to a machine tool so as to face a processing tool. In the spindle head, a main shaft that rotatably supports a spindle to which a tool is mounted is rotated, and a workpiece is processed while holding the spindle at a predetermined rotation position or while rotating the spindle.

BACKGROUND ART

In Patent Document 1, a ram is provided at a machine tool so as to be movable in three axial directions, that is, an X-axis direction, a Y-axis direction, and a Z-axis direction; a rotating table is attached to the ram; and a spindle head is mounted to the rotating table. By this, the spindle head is mounted to the machine tool so as to be rotatable and so as to movable in the three axial directions (that is, the X-axis direction, the Y-axis direction, and the Z-axis direction). The spindle head has a frame, a main shaft, and a pair of support shafts. The frame has a pair of legs and is formed in a U shape. The main shaft supports a spindle and is disposed between the legs. The pair of support shafts are orthogonal to the main shaft. The pair of support shafts are provided on respective sides of the main shaft, are secured to the main shaft, and are coaxially formed with respect to each other. The pair of support shafts are rotatably supported at the pair of legs. One of the support shafts is connected to a motor. The motor is driven to rotate the support shaft. The rotation of the support shaft causes the main shaft to rotate. With the spindle being held at a predetermined rotation position by rotating the main shaft, a workpiece is processed by moving the main head by moving the ram. Depending upon circumstances, the workpiece may be processed by rotating the spindle by rotating the main shaft. The movement of the ram thereof in the three axial directions, that is, the X-axis direction, the Y-axis direction, and the Z-axis direction, the rotation of a motor of the rotating table, and the rotation of the motor of the support shaft are performed when a controlling device of the machine tool performs numerical control on the basis of programming. In the machine tool in which a processing table on which a workpiece is placed is movable, the processing table is moved by the controlling device of the machine tool performing numerical control on the basis of programming.

Patent Document 1: Japanese Patent No. 3761230

DISCLOSURE OF INVENTION

Problems to be Solved by the Invention

However, the movement of the main shaft and the movement of the processing table are numerically controlled as mentioned above. When moving the tool or the processing table at a predetermined position to a predetermined processing position or a standby position by rotating the main shaft, by moving the ram, or, depending upon circumstances, by moving the processing table, the main shaft or the processing table may move unexpectedly due to, for example, a programming error made by an operator or an input of an external disturbance signal, such as noise, to the controlling device. Therefore, during the movement, an interference accident, in which, for example, the tool or the spindle collides with, for example, a processing jig or a workpiece, may occur. In an interference accident in which impact force is large, the spindle and, depending upon circumstances, the main shaft may be deformed beyond a permissible range. In this case, in order to maintain processing precision, it is necessary to replace part of or the entire main shaft or spindle.

In view of the aforementioned related problems, it is an object of the present invention to, in a spindle head for a machine tool, reduce impact force to a spindle to prevent the spindle from becoming deformed beyond a permissible range even if an interference accident (in which, for example, a tool or the spindle interferes with, for example, a processing jig or a workpiece during movement of the tool or movement a processing table towards, for example, a processing position) occurs.

Means for Solving the Problems

The present invention is carried out to achieve the aforementioned object, and provides a spindle head for a machine tool, the spindle head including a main shaft that rotatably supports a spindle to which a tool is mounted; a pair of support shafts including coaxial axial lines which intersect the main shaft, the pair of support shafts being provided on respective sides of the main shaft and being secured to the main shaft; a frame that rotatably supports the pair of support shafts; and a rotation driving device for at least one of the pair of support shafts, in which the spindle is rotated around the axial lines of the support shafts by the rotation driving device. In the spindle head, two rotating members that form a rotation transmission mechanism for rotating the spindle and that transmit drive force of the rotation driving device are fastened to each other at respective connection sections thereof by a bolt group and are connected to each other so as to be prevented from rotating relative to each other by friction force resulting from the fastening. Rotation prevention torque based on the friction force is a value greater than torque applied to the connection sections during processing and smaller than torque applied to the connection sections when external force that causes the spindle to deform beyond a permissible range during the rotation of the spindle is applied to the spindle.

In addition, the main shaft and the support shaft driven by the rotation driving device are fitted to each other to form the two rotating members, and are fastened to each other by a predetermined fastening force with the bolt group.

Further, the rotation driving device includes a motor including a rotor, provided at the support shaft, and a stator, provided at the frame so as to face the rotor; and the rotor is fastened to the support shaft by a fastening force that is greater than the predetermined fastening force using a different bolt group positioned outwardly of the bolt group in a radial direction of the support shaft.

Further, the spindle head for the machine tool comprises a clamping device and connection sections, the clamping device being disposed around the axial line of the support shaft and including a push member for maintaining a rotation position of the spindle by directly or indirectly acting upon the support shaft, the connection sections being provided coaxially with the axial line of the support shaft from an acting position of the push member to the main shaft at the axial line of the support shaft, the connection sections being fastened to each other by a bolt group, the connection sections being connected to each other so as to be prevented from rotating relative to each other by friction force resulting from the fastening. Rotation prevention torque based on the friction force is a value greater than torque applied to the connection sections during processing and smaller than torque applied to the connection sections when the external force that causes the spindle to deform beyond the permissible range during operation of the clamping device is applied to the spindle.

Further, the clamping device includes a braking member facing the push member, the braking member being fastened to the support shaft by a fastening force that is greater than the predetermined fastening force with a different bolt group positioned outwardly of the bolt group in a radial direction of the support shaft.

Further, the clamping device includes a braking member facing the push member, the braking member being fastened to the support shaft by a fastening force that is greater than the predetermined fastening force with a different bolt group positioned outwardly of the bolt group in a radial direction of the support shaft.

Further, a spindle head for a machine tool includes a main shaft that rotatably supports a spindle to which a tool is mounted; a pair of support shafts including coaxial axial lines which intersect the main shaft, the pair of support shafts being provided on respective sides of the main shaft and being secured to the main shaft; a frame that rotatably supports the pair of support shafts; and a rotation driving device for at least one of the pair of support shafts, in which the spindle is rotated around the axial lines of the support shafts by the rotation driving device. The spindle head comprises a clamping device and connection sections, the clamping device being disposed around the axial line of the support shaft and including a push member for maintaining a rotation position of the spindle by directly or indirectly acting upon the support shaft, the connection sections being provided coaxially with the axial line of the support shaft from an acting position of the push member to the main shaft at the axial line of the support shaft, the connection sections being fastened to each other by a bolt group, the connection sections being connected to each other so as to be prevented from rotating relative to each other by friction force resulting from the fastening. Rotation prevention torque based on the friction force is a value greater than torque applied to the connection sections during processing and smaller than torque applied to the connection sections when an external force that causes the spindle to deform beyond a permissible range during operation of the clamping device is applied to the spindle.

Further, the main shaft and the support shaft upon which the push member acts are fitted to each other to form the connection sections, and are fastened to each other by a predetermined fastening force with the bolt group.

Further, the clamping device includes a braking member facing the push member, the braking member being fastened to the support shaft by a fastening force that is greater than the predetermined fastening force with a different bolt group positioned outwardly of the bolt group in a radial direction of the support shaft.

Advantages

In the spindle head for the machine tool, the two rotating members transmitting driving force of the rotation driving device are fastened together at their connection sections by the bolt group. The rotation prevention torque based on the friction force resulting from the fastening is set to a value that is greater than the torque applied to the connection sections during processing. Therefore, in detail, a force (hereunder simply referred to as "processing force) is applied to the connection sections from the workpiece through a tool, so that the connection sections are fastened under a processing condition that requires maximum processing force. The rotation prevention torque based on the friction force resulting from the fastening is set to a value that is larger than the torque that is applied to the connection sections under such a processing condition. Therefore, relative movement, that is, relative rotation around a rotation axial line as center does not occur between the two rotating members, so that the processing is precisely performed. The rotation prevention torque is set to a value that is less than the torque applied to the connection sections when an external force that deforms the spindle beyond the permissible range is applied to the spindle. "The torque applied to the connection sections when an external force that deforms the spindle beyond the permissible range is applied to the spindle" refers to "torque that is generated at the connection sections when it is assumed that an external force that deforms the spindle beyond the permissible range is applied to the connection sections." Accordingly, when, due to moving the tool to the processing position or the standby position, an interference accident (in which the spindle or the tool collides with, for example, the processing jig or a workpiece during the rotation of the tool caused by driving the rotation driving device) occurs, driving force is transmitted from the driving device to the tool or the spindle whose rotation is stopped by, for example, the processing tool or the workpiece. This causes the processing jig or the workpiece to be pushed. A reaction force acts as an external force, and torque based on the reaction force is applied to the connection sections. If this torque does not exceed the rotation prevention torque, the spindle deforms within the permissible range. However, if this torque exceeds the rotation prevention torque, the two rotating members that transmit the driving force of the rotation driving device rotate relative to each other. In detail, there is a gap between a bolt and a bolt insertion hole, and the two rotating members can rotate relative to each other in correspondence with the gap. Since, at this time, friction force is generated between the two rotating members, collision energy is absorbed, that is, the collision energy is consumed by relative rotation of the two rotating members caused by the friction force. As a result, a large force is not applied to the spindle. Therefore, the spindle does not deform beyond the permissible range, and damage thereto is restricted.

The main shaft and the support shaft that are driven by the rotation driving device are fitted to each other and form two rotating members, and are fastened together by a predetermined fastening force by the bolt group. Therefore, the rotation prevention torque based on the friction force between the support shaft and the main shaft is larger than the torque that is applied by the processing force. Relative rotation during the processing, that is, relative rotation around the support shaft as center does not occur, and an interference accident (in which the spindle or the tool collides with, for example, the processing tool or the workpiece) occurs. Therefore, if a torque exceeding the rotation prevention torque is applied to the support shaft and the main shaft, the support shaft and the main shaft rotate relative to each other. The support shaft and the main shaft rotate relative to each other while the friction force acts, so that collision energy is absorbed. Consequently, a large force is not applied to the spindle, so that damage to the spindle is restricted.

By a different bolt group positioned outwardly of the bolt group in a radial direction of the support shaft, the rotor is fastened to the support shaft by a fastening force that is larger than the predetermined fastening force. Therefore, the rotation prevention torque based on the friction force between the rotor and the support shaft is reliably greater than the rotation prevention torque based on the friction force between the support shaft and the main shaft. An interference accident occurs. Therefore, if a torque exceeding the rotation prevention torque based on the friction force is applied to the support shaft and the main shaft, the support shaft and the main shaft can rotate relative to each other, and the rotor and the support shaft can be prevented from moving relative to each other. By this, it is possible to restrict collision force applied to the spindle from being applied to the support shaft by the relative rotation between the main shaft and the support shaft. In other words, the spindle and the main shaft, which are integrated to each other, are such that a mass that does not include that of the support shaft is reduced. Therefore, collision force is reduced, thereby restricting deformation of the spindle.

Relative rotation between the connection sections around the axial line of the support shaft as center by external force during processing, that is, processing force does not occur, so that the processing can be precisely performed. In operating the clamping device, if an interference accident in which the spindle or the tool collides with, for example, the processing tool or the workpiece occurs due to, for example, a programming error during the movement of the spindle head or the movement of the processing table, the tool or the spindle whose rotation is stopped by the clamping device pushes, for example, the processing tool or the workpiece. The reaction force acts as an external force. Torque based on the reaction force is applied to the connection sections disposed from an operation position of the push member, that is, a clamp position to the main shaft. If the torque does not exceed the rotation prevention torque at the connection sections, the spindle deforms within the permissible range. However, if this torque exceeds the rotation prevention torque, the connection sections rotate relative to each other. By the relative rotation caused by the action of the friction force at the connection sections, collision energy is consumed. As a result, a large force is not applied to the spindle. Therefore, deformation of the spindle beyond the permissible range is restricted, so that damage thereto is restricted.

The main shaft and the support shaft upon which the push member acts are fitted to each other to form the connection sections, and are fastened together by a predetermined fastening force by the bolt group. Therefore, the rotation prevention torque based on the friction force between the support shaft and the main shaft is larger than the torque that is applied by the processing force. Relative rotation during the processing, that is, relative rotation around the support shaft as center does not occur, and an interference accident (in which the spindle or the tool collides with, for example, the processing tool or the workpiece) occurs. Therefore, if a torque exceeding the rotation prevention torque is applied to the support shaft and the main shaft, the support shaft and the main shaft rotate relative to each other. The support shaft and the main shaft rotate relative to each other while the friction force acts, so that collision energy is absorbed. Consequently, a large force is not applied to the spindle, so that damage to the spindle is restricted.

By a different bolt group positioned outwardly of the bolt group in a radial direction of the support shaft, the braking member is fastened to the support shaft by a fastening force that is larger than the predetermined fastening force. Therefore, the rotation prevention torque based on the friction force between the braking member and the support shaft is made reliably greater than the rotation prevention torque based on the friction force between the support shaft and the main shaft. An interference accident occurs. Therefore, if a torque exceeding the rotation prevention torque based on the friction force is applied to the support shaft and the main shaft, the support shaft and the main shaft can rotate relative to each other, and the braking member and the support shaft can be prevented from moving relative to each other. By this, it is possible to inhibit collision force applied to the spindle from being applied to the support shaft by the relative rotation between the main shaft and the support shaft. In other words, the spindle and the main shaft, which are integrated to each other, are such that a mass that does not include that of the support shaft is reduced. Therefore, the collision force is reduced, thereby restricting deformation of the spindle.

Relative movement, that is, relative rotation around the axial line as center between the connection sections by external force during processing, that is, processing force does not occur, so that the processing can be precisely performed. In operating the clamping device, if an interference accident in which the spindle or the tool collides with, for example, the processing tool or the workpiece occurs due to, for example, a programming error during the movement of the spindle head or the movement of the processing table, the tool or the spindle whose rotation is stopped by the clamping device pushes, for example, the processing tool or the workpiece. The reaction force acts as an external force. Torque based on the reaction force is applied to the connection sections disposed from an operation position of the push member, that is, a clamp position to the main shaft. If the torque does not exceed the rotation prevention torque at the connection sections, the spindle deforms within the permissible range. However, if this torque exceeds the rotation prevention torque, the connection sections rotate relative to each other. By the relative rotation caused by the action of the friction force at the connection sections, collision energy is consumed. As a result, a large force is not applied to the spindle. Therefore, deformation of the spindle beyond the permissible range is restricted, so that damage thereto is restricted.

The main shaft and the support shaft upon which the push member acts are fitted to each other to form the connection sections, and are fastened together by a predetermined fastening force by the bolt group. Therefore, the rotation prevention torque based on the friction force between the support shaft and the main shaft is larger than the torque that is applied by the processing force. Relative rotation during the processing, that is, relative rotation around the support shaft as center does not occur, and an interference accident (in which the spindle or the tool collides with, for example, the processing tool or the workpiece) occurs when the clamping device operates. Therefore, if a torque exceeding the rotation prevention torque is applied to the support shaft and the main shaft, the support shaft and the main shaft rotate relative to each other. The support shaft and the main shaft rotate relative to each other while the friction force acts, so that collision energy is absorbed. Consequently, a large force is not applied to the spindle, so that damage to the spindle is restricted.

By a different bolt group positioned outwardly of the bolt group in a radial direction of the support shaft, the braking member is fastened to the support shaft by a fastening force that is larger than the predetermined fastening force. Therefore, the rotation prevention torque based on the friction force between the braking member and the support shaft is made reliably greater than the rotation prevention torque based on the friction force between the support shaft and the main shaft. Therefore, if, when the clamping device operates, a torque exceeding the rotation prevention torque based on the friction force is applied to the support shaft and the main shaft, the support shaft and the main shaft can rotate relative to each other, and the braking member and the support shaft can be prevented from moving relative to each other. By this, it is possible to inhibit collision force applied to the spindle from being applied to the support shaft by the relative rotation between the main shaft and the support shaft. In other words, the spindle and the main shaft, which are integrated to each other, are such that a mass that does not include that of the support shaft is reduced. Therefore, the collision force is reduced, thereby restricting deformation of the spindle.

BRIEF DESCRIPTION OF DRAWINGS

FIG. 7 is a top view of a frame 4 having a support stud 5 and a support stud 6 disposed thereat.

REFERENCE NUMERALS

Figure 1:
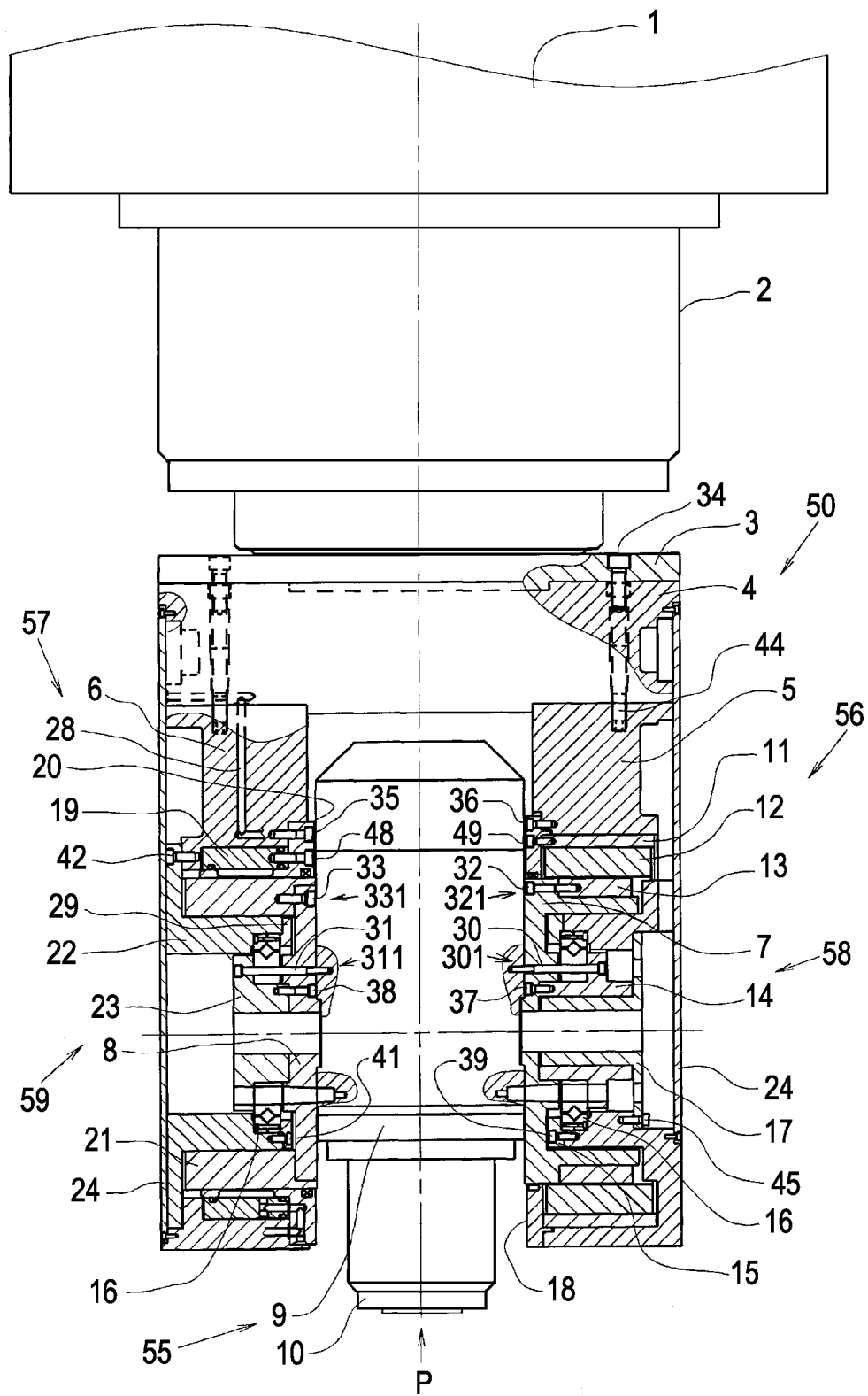
FIG. 1 shows the entire spindle head 50 according to an embodiment of the present invention, with a portion of FIG. 1 being shown in cross section.

1 ram
2 head motor
3 head holder
4 frame
4*a* tapered hole
5 support stud
5*a* tapered hole
5*b* internal thread
6 support stud
6*a* tapered hole
6*b* internal thread
7 drive-side fitting shaft
7*a* fitting shaft portion
7*b* flat surface
7*c* sleeve
7*d* tapered hole
8 driven-side fitting shaft
8*a* fitting shaft portion
8*b* flat surface
8*c* tapered hole
9 main shaft
9*a* support shaft fitting hole
9*b* support shaft fitting hole
9*c* flat surface
9*d* flat surface
9*e* internal thread
9*f* internal thread
9*g* tapered hole
9*h* internal thread
10 spindle
11 stator holder
12 stator
13 rotor
14 bearing holder
15 bearing plate
16 bearing
17 rotary joint body
18 motor plate
19 clamp cylinder
20 clamp sleeve
20*a* annular sleeve
21 clamp ring
22 bearing holder
23 bearing holder
24 cover
26 tapered pin
26*a* internal thread
28 fluid path
29 bearing plate
30 bolt
31 bolt
32 bolt
34 bolt
35 bolt
36 bolt
37 bolt
38 bolt
39 bolt
41 bolt
42 bolt
44 bolt
45 bolt
46 press-fit bolt
47 removal bolt
48 bolt
49 bolt
50 spindle head
55 spindle unit
56 support shaft motor
57 clamping device
58 support shaft
59 support shaft
301 bolt group
311 bolt group
321 bolt group
331 bolt group

BEST MODES FOR CARRYING OUT THE INVENTION

Figure 2:
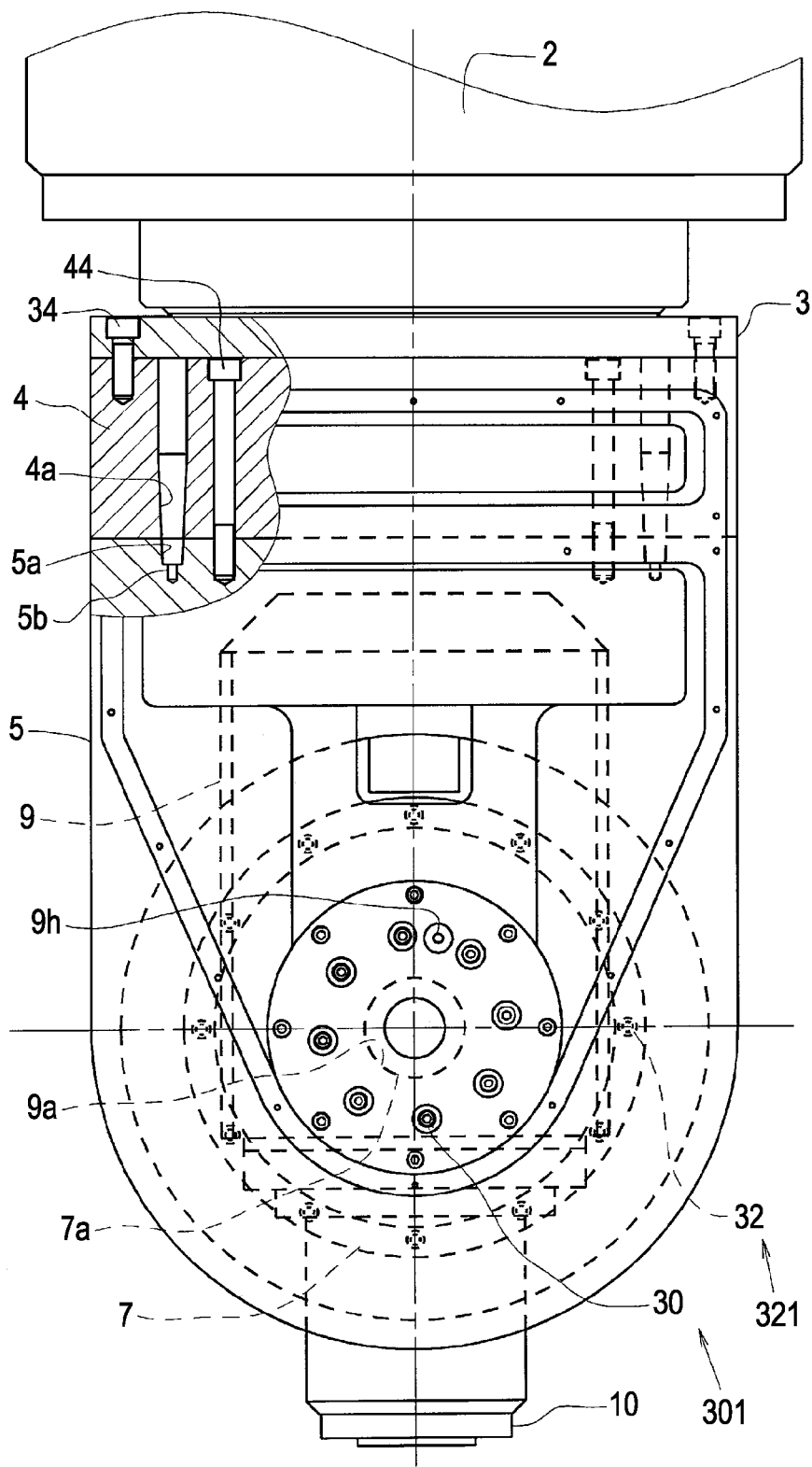
FIG. 2 is a right side view of FIG. 1, and shows a state after removal of a cover 24.
Figure 3:
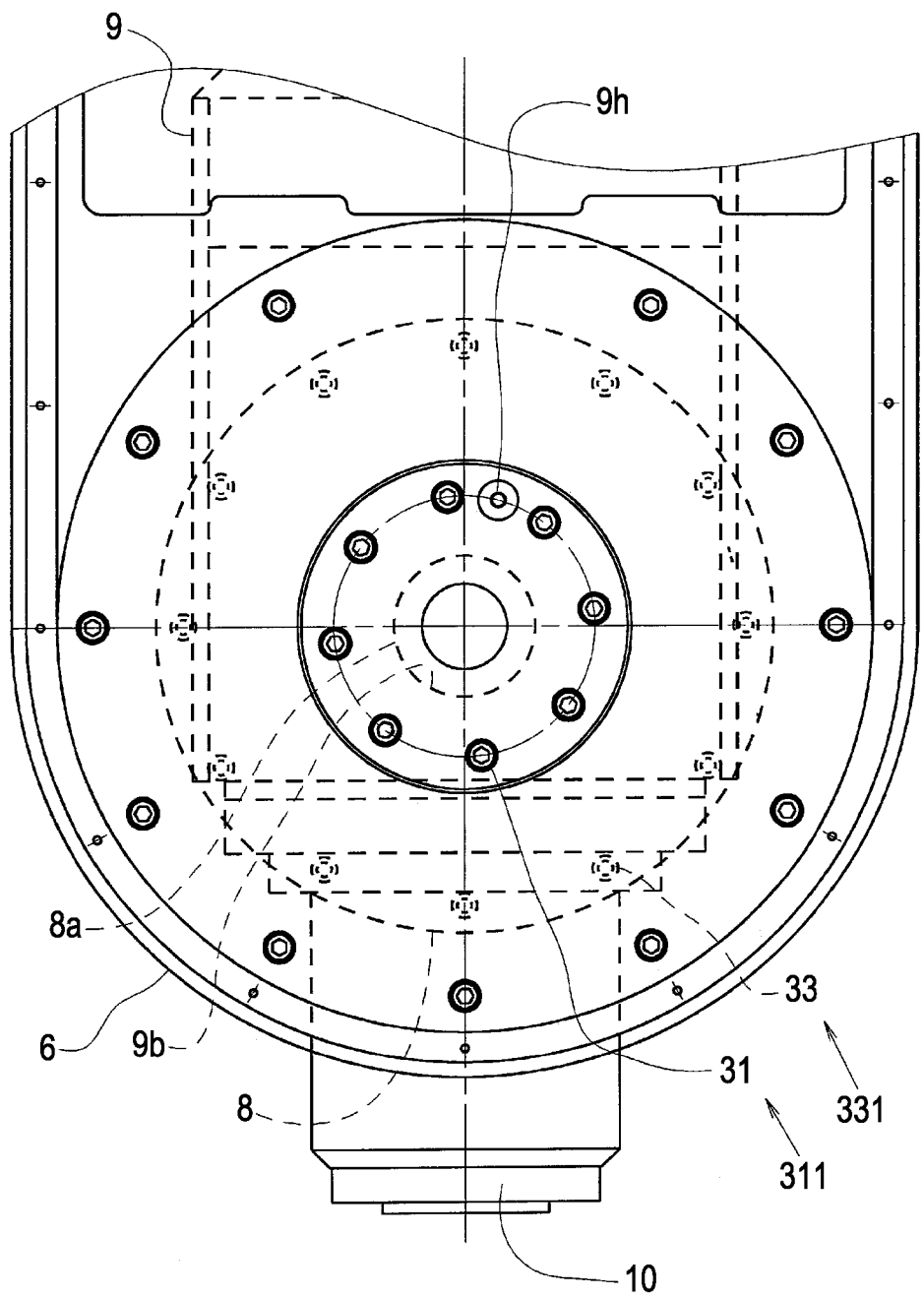
FIG. 3 is a left side view of FIG. 1, and shows a state after the removal of the cover 24.
Figure 4:
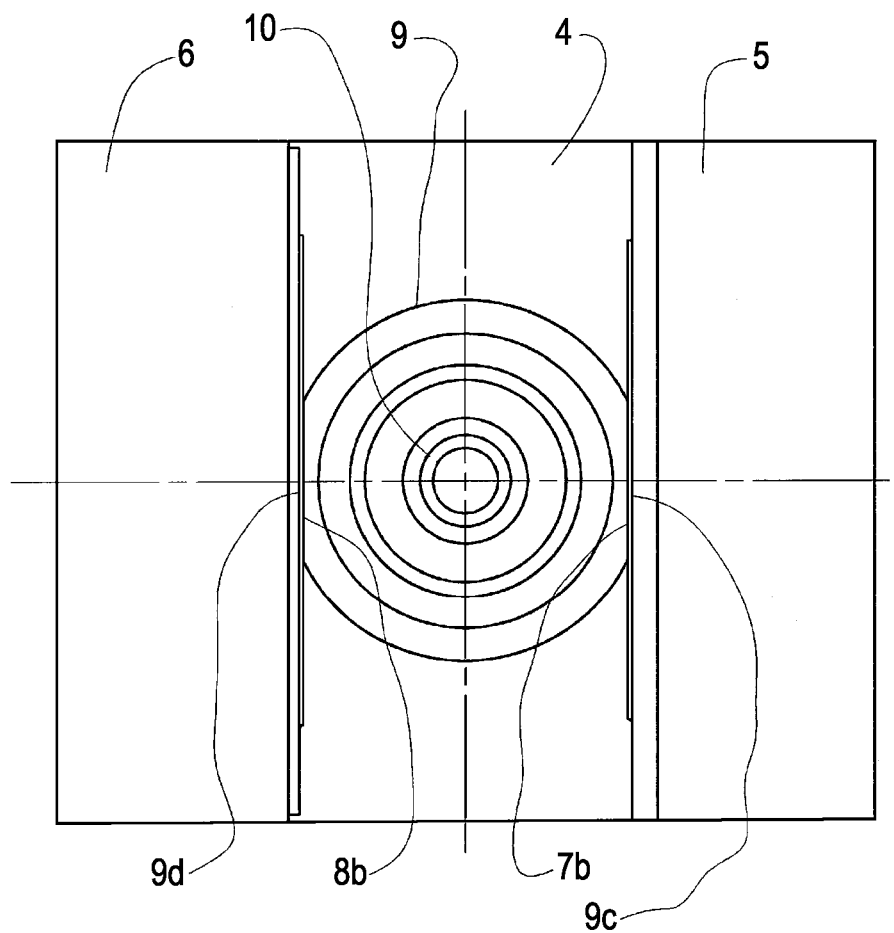
FIG. 4 is a plan view as seen from a P direction in FIG. 1.
Figure 5:
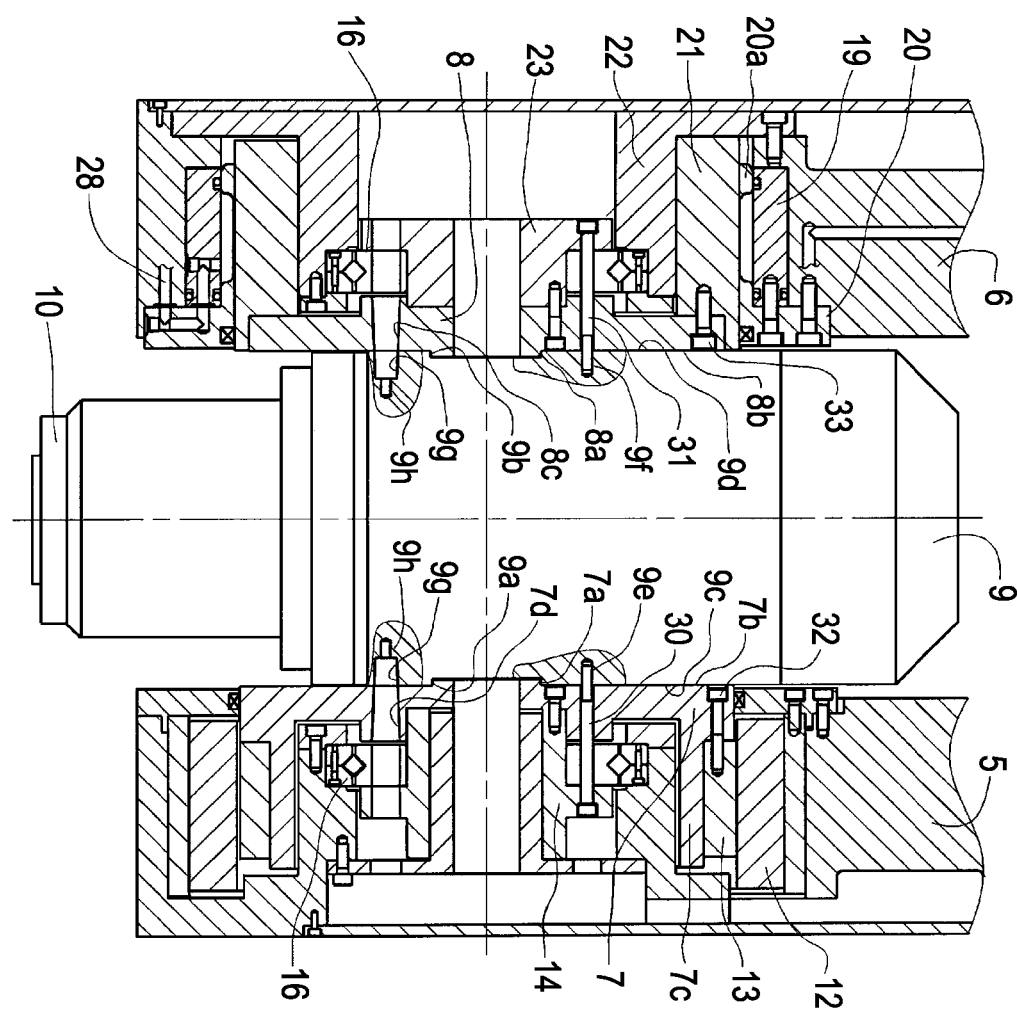
FIG. 5 is an enlarged view of the main portion of FIG. 1.
Figure 6:
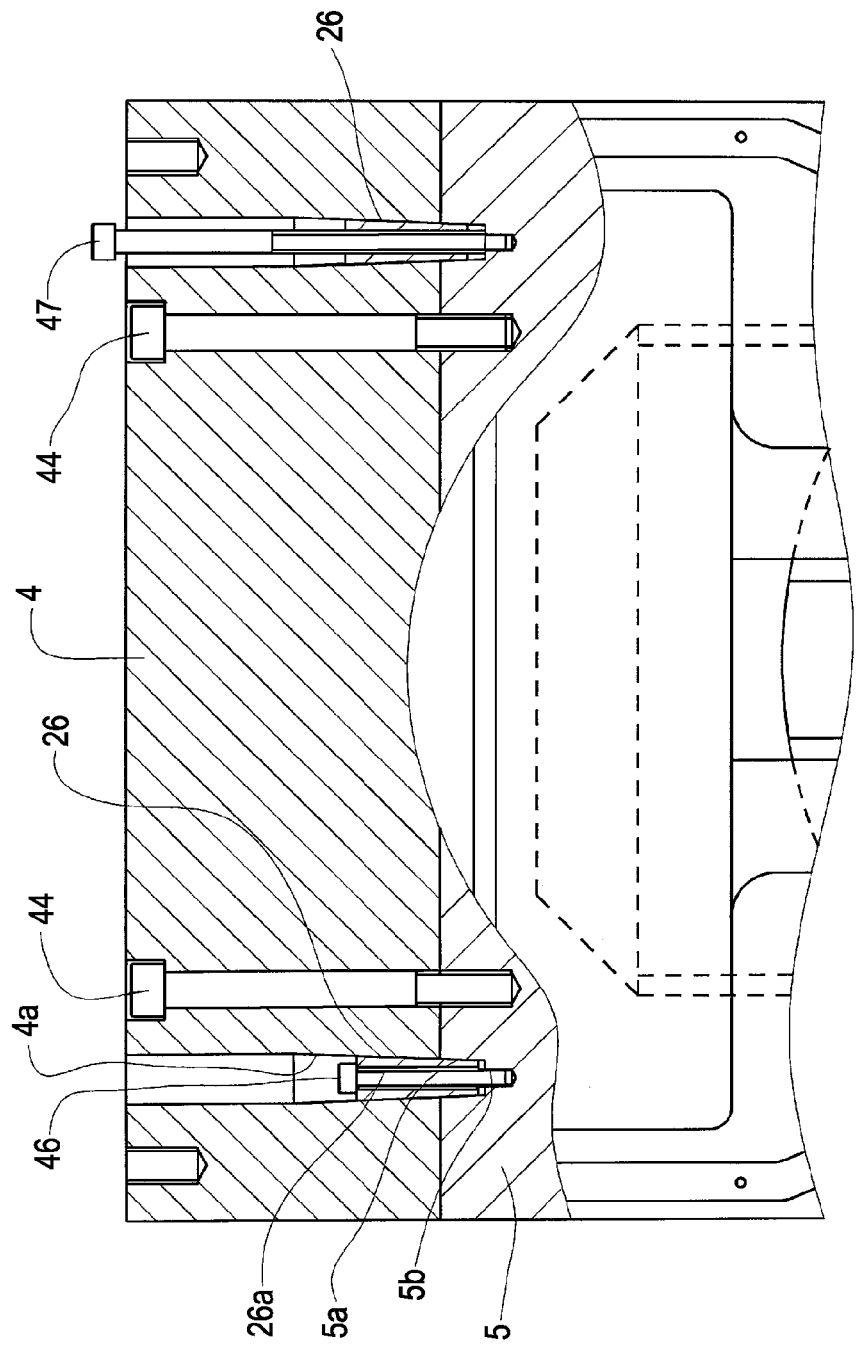
FIG. 6 shows a state after removal of the spindle head 50 from a head motor 2 in FIG. 2.

Embodiments of the present invention will hereunder be described with reference to the drawings. FIGS. 1 to 7 show a spindle head 50 according to an embodiment of the present invention. FIG. 1 shows the entire spindle head 50 that is mounted to a ram 1 for a machine tool through a head motor 2, with a portion of FIG. 1 being shown in cross section. FIGS. 2 and 3 are, respectively, a right side view and a left side view of FIG. 1, and show a state after removal of a cover 24. FIG. 4 is a plan view as seen from a P direction in FIG. 1. FIG. 5 is an enlarged view of the main portion of FIG. 1. FIG. 6 shows a state after removal of the spindle head 50 from the head motor 2 for positioning and securing a frame 4 and a support stud 5 and the frame 4 and a support stud 6, which form the spindle head 50. FIG. 6 shows a state during the positioning and the securing of the frame 4 and the support stud 5. FIG. 7 is a top view of the frame 4 having the support stud 5 and the support stud 6 disposed thereat, and shows tapered pin holes 4*a*, 5*a*, and 6*a* for positioning the frame 4 and the support stud 5 and the frame 4 and the support stud 6, and the arrangement of the tapered pin holes 4*a*, 5*a*, and 6*a*.

The spindle head 50 according to the embodiment is mounted to the ram 1 for the machine tool through the head motor 2 so as to face a processing table (not shown) at which a workpiece is placed. The ram 1 is movable in three axial directions, that is, an X-axis direction, a Y-axis direction, and a Z-axis direction. The spindle head 50 is provided so as to be rotatable by the head motor in addition to being movable in the three axial directions. In detail, the head motor 2 is mounted to the lower surface of the ram 1, and the frame 4 is secured to a head holder 3 (connected to a rotary shaft of the head motor) through a bolt 34.

The spindle head 50 includes the frame 4, secured to the head holder 3, and the support studs 5 and 6. The support studs 5 and 6 are secured to respective sides of the lower surface of the frame 4, that is, respective right and left sides in FIG. 1, through bolts 44. A frame member including the frame 4, the support stud 5, and the support stud 6 is formed in an inverted U shape in FIG. 1. A spindle unit 55 is disposed between the support stud 5 and the support stud 6, and, as described later, is rotatably supported by the support stud 5 and the support stud 6. The spindle unit 55 includes a spindle 10, a main shaft 9, and an internal motor (not shown). A tool is mounted to the spindle 10. The main shaft 9 rotatably supports the spindle 10. For the internal motor, the spindle 10 serves as a rotary shaft. As shown in FIGS. 4 and 5, flat surfaces 9c and 9d that are parallel to each other are formed at a support-stud-5 side and a support-stud-6 side of the main shaft 9. Fitting holes 9a and 9b are formed in the flat surfaces 9c and 9d, respectively, so as to include coaxial lines that intersect with, that is, in the embodiment, that are orthogonal to the main shaft 9. A drive-side fitting shaft 7 and a driven-side fitting shaft 8 are fitted to the fitting holes 9a and 9b, respectively. The drive-side fitting shaft 7 and the driven-side fitting shaft 8 include respective flat surfaces 7b and 8b, contact the respective flat surfaces 9c and 9d of the main shaft 9, and include respective fitting shaft portions 7a and 8a. Bearing holders 14 and 23 are fitted to sides of the drive-side fitting shaft 7 and the driven-side fitting shaft 8 opposite to the main-shaft-9-side end portion. The bearing holders 14 and 23 are coaxially formed at the drive-side fitting shaft 7 and the driven-side fitting shaft 8, respectively, so as to be integrated thereto through respective bolts 37 and 38. Therefore, the drive-side fitting shaft 7 and the bearing holder 14 form a support shaft 58, and the driven-side fitting shaft 8 and the bearing holder 23 form a support shaft 59. The support shaft 58 and the support shaft 59 are orthogonal to the main shaft 9, and are fitted to the coaxial fitting holes 9a and 9b. Therefore, the pair of support shafts 58 and 59 including coaxial axial lines that intersect with the main shaft 9 are provided on respective sides of the main shaft 9.

The support shafts 58 and 59 are hollow, and can receive a pipe (not shown) for supplying, for example, a tool chucking pressure fluid, processing liquid, or cooling cleaning liquid that flows from the outside to the spindle 10 through the axial center portions of the support shafts 58 and 59.

Bearings 16 are fitted to the outer peripheral surfaces of the respective bearing holders 14 and 23. The bearings 16 have a plurality of bolt insertion holes at their inner rings. As shown in FIGS. 2 and 3, the bolt insertion holes are in correspondence with a plurality of bolt insertion holes of the driven-side fitting shaft 8, the drive-side fitting shaft 7, and flanges of the bearing holders 14 and 23. These plurality of bolt insertion holes are in correspondence with a plurality of internal threads 9e and 9f provided at the respective flat surfaces 9c and 9d of the main shaft 9.

At the support-stud-5 side positioned on the right side of the main shaft 9 in FIG. 1, a plurality of bolts 30 form a bolt group 301; and the bolts 30 are inserted into the respective bolt insertion holes of the bearing holder 14, the bearing 16, and the drive-side fitting shaft 7, and are screwed into the internal threads 9e of the main shaft 9. By this, the drive-side fitting shaft 7, the bearing 16, and the main shaft 9, that is, the support shaft 58 and the main shaft 9 are fastened to each other by the bolt group 301. Similarly, at the support-stud-6 side of the main shaft 9, a plurality of bolts 31 form a bolt group 311; and the bolts 31 are inserted into the respective bolt insertion holes of the bearing holder 23, the bearing 16, and the driven-side fitting shaft 8, and are screwed into the internal threads 9f of the main shaft 9. By this, the driven-side fitting shaft 8, the bearing holder 23, and the main shaft 9, that is, the support shaft 59 and the main shaft 9 are fastened to each other by the bolt group 311.

In the embodiment, the bearings 16 are cross roller bearings. In terms of manufacturing, an outer ring is divided into two divided outer rings in the axial direction, and the two divided rings are fastened to each other by a bolt. The bearing 16 whose inner ring is fitted to the bearing holder 14 has its outer ring fitted to the support stud 5. A bearing plate 15 is fastened to the support stud 5 through a bolt 39. By this, the outer ring of the bearing 16 is interposed between the support stud 5 and the bearing plate 15, and is secured to the support stud 5.

The bearing 16 whose inner ring is fitted to the bearing holder 23 has its outer ring fitted to the bearing holder 22. In the bearing holder, a portion of the outer peripheral surface of the end-portion flange is fitted to the support stud 6 and is fastened to the support stud 6 through a bolt 42. In addition, a bearing plate 29 is fastened to an end portion of the bearing holder 22 through a bolt 41. By this, the outer ring of the bearing 16 is interposed between the bearing holder 22 and the bearing plate 29, and is secured to the support stud 6.

The drive-side fitting shaft 7 is provided with a sleeve 7c at an outer portion in a radial direction. The sleeve 7c extends in an axial direction and surrounds an outer-ring fitting portion of the bearing 16 at the support stud 5. A rotor 13 having a plurality of magnets (not shown) is fitted to the outer peripheral surface of the sleeve 7c. An internal thread is provided at a main-shaft-9-side end portion of the rotor 13. The main-shaft-9-side end portion of the rotor 13 and a surface of the drive-side fitting shaft at the side opposite to the main shaft 9 are fastened to each other through a plurality of bolts 32 positioned outwardly of the bolts 30 in the radial direction.

At a side situated outwardly of the fitting surface of the outer ring of the bearing 16 in the radial direction, the support stud 5 has a recessed portion (whose main-shaft-9 side is open) around an axis of the drive-side fitting shaft 7. The recessed portion accommodates the rotor 13, the sleeve 7c of the drive-side fitting shaft 7, a stator holder 11, and a stator 12 mentioned below. At an outer side portion of the recessed portion in the radial direction, the support stud 5 has an inner peripheral surface that is coaxial with the fitting surface of the outer ring of the bearing 16. The stator holder 11 is fitted to the inner peripheral surface. The stator 12 having a plurality of winding coils (not shown) is fitted to the stator holder 11. The stator 12 faces the rotor 13. The stator holder 11 is fastened to the motor plate 18 by a bolt 49. The motor plate 18 is fastened to the support stud 5 by a bolt 36. Therefore, the stator holder 11 is secured to the support stud 5 through the motor plate 18. By this, a support shaft motor 56 including the stator 12 and the rotor 13 is formed in the recessed portion of the support stud 5.

At the support-stud-6 side situated on the left of the main shaft 9 in FIG. 1, a clamp ring 21 at which the inner peripheral surface of a sleeve is fitted to the outer peripheral surface of the driven-side fitting shaft 8 is provided. The clamp ring 21 and the driven-side fitting shaft 8 are fastened to each other through a plurality of bolts 33 positioned outwardly of the bolts 31 in the radial direction. Two different fitting surfaces that are coaxial with the outer-ring fitting surface of the bearing 16 at the bearing holder 22 are formed at the support stud 6 in the axial direction. A clamp cylinder 19 is fitted to one of the fitting surfaces, while a clamp sleeve 20 is fitted to the other fitting surface. The clamp sleeve 20 is such that a mounting flange is fastened to the support stud 6 by a bolt 35. The clamp cylinder 19 is fastened to the mounting flange of the clamp sleeve 20 by a bolt 48. Therefore, the clamp cylinder 19 is secured to the support stud 6 through the clamp sleeve 20.

The clamp sleeve 20 has an annular sleeve 20a extending in an axial direction from the mounting flange and facing the clamp cylinder 19. The annular sleeve 20a is formed in a U shape in cross section, and is thin except its both end portions. An annular pressure fluid chamber is formed between the annular sleeve 20a and the clamp cylinder 19. A fluid path 28 extending from an externally provided pressure-fluid supply device communicates with the pressure fluid chamber. When processing a workpiece, by supplying pressure fluid, such as high-pressure operating oil, through the fluid path 28, a thin-walled portion of the annular sleeve 20a is such that its diameter is reduced, presses the clamp ring 21, and integrates the clamp ring 21 and the clamp sleeve 20 to each other. That is, the clamp ring 21 is secured to the support stud 6. By this, the support shaft 59, fastened to the clamp ring 21 through the plurality of bolts 33, and the main shaft 9, fastened to the support shaft 59 through the bolts 31, are clamped so as to be incapable of rotating relatively to the frame member of the spindle head 50, the frame member including the support studs 5 and 6, and the frame 4. The spindle 10 is such that its rotation position is maintained. By external force during processing, that is, reaction force from the workpiece applied through a tool, the rotation of the main shaft 9 is stopped, thereby maintaining processing precision. In this way, the clamp ring 21 is provided as an annular braking member. In addition, the clamp sleeve 20 and the clamp cylinder 19 are provided as push members, and form a clamping device 57 according to the present invention along with the fluid path 28 and the pressure-fluid supplying device.

In order to set a tool (not shown) mounted to the spindle 10 at a predetermined rotational angle with respect to a workpiece on the processing table, a controlling device for the machine tool drives the support shaft motor 56 (constituting a rotation driving device according to the present invention) rotates the rotor 13, and rotates the bearing holder 14 and the drive-side fitting shaft 7 (fastened to the rotor 13 through the plurality of bolts 32), that is, the support shaft 58. The support shaft 58 is fastened to the main shaft 9 through the plurality of bolts 30. The support shaft 58 rotates to rotate the main shaft 9, and the spindle 10, provided at the main shaft 9, rotates around the axes of the support shafts 58 and 59. In this way, the rotor 13 and the support shaft 58 and the support shaft 58 and the main shaft 9 correspond to two rotating members according to the present invention. The rotor 13, the support shaft 58, and the main shaft 9 constitute a rotation transmission mechanism for rotating the spindle 10 according to the present invention, and transmit driving force of the support shaft motor 56 (serving as the rotation driving device) to rotate the spindle 10.

When the spindle 10 or a tool collides with, for example, a processing jig or a workpiece due to, for example, a programming error during the rotation of the spindle 10 achieved by the support shaft motor 56, the main shaft 9 and the support shaft 58 rotate relative to each other, that is, sliding occurs. The controlling device for the machine tool performs an emergency braking operation on the support shaft motor 56 by detecting the relative rotation between the main shaft 9 and the support shaft 58.

As shown in FIG. 2, the bolts 30 that fasten the main shaft 9 and the drive-side fitting shaft 7 to each other are provided at an equal interval along a circumferential direction around an axial center of the support shaft 58 as center. The bolts 30 constitute the bolt group 301. The bolts 32 that fasten the drive-side fitting shaft and the rotor 13 to each other are provided at an equal interval along the circumferential direction around the axial center of the support shaft 58 as center. The bolts 32 constitute a different bolt group 321. Each bolt 30 constituting the bolt group 301 is fastened by a predetermined fastening torque value using, for example, a torque wrench. The main shaft 9 and the drive-side fitting shaft 7 are fastened to each other at connection sections using the plurality of bolts 30. Push force at the flat surface 9c of the main shaft 9 and the flat surface 7b of the drive-side fitting shaft 7 becomes a predetermined value, so that they are fastened to each other by the predetermined fastening force at the connection sections. Friction force where the flat surface 9c and the flat surface 7b contact each other is a value resulting from multiplying the friction coefficient between the flat surface 9c and the flat surface 7b to the fastening force. Force that prevents relative rotation between the main shaft 9 and the support shaft 58 at a very small contact surface where the flat surface 9c and the flat surface 7b contact each other, that is, a rotation prevention torque is a value resulting from multiplying the distance between the very small contact surface and the axial center of the support shaft 58 to the friction force for each very small contact surface. The rotation prevention torque at the entire contact surface where the flat surface 9c and the flat surface 7b contact each other is equal to the total sum of the rotation prevention torque of each very small contact surface. Since the push force is greatest at a peripheral portion near each bolt 30, the friction force is greatest at the peripheral portion near each bolt 30. Therefore, rotation prevention torque at the peripheral portion near each bolt 30 accounts for a large portion of the rotation prevention torque at the entire connection sections. Therefore, the rotation prevention torque at the connection sections is a value resulting from multiplying the number of bolts 30 to the fastening force of the bolts 30. That is, it can be approximately obtained by multiplying the fastening force of the bolt group 301, the friction coefficient between the flat surface 9c and the flat surface 7b, and the distance between the axial center of the support shaft 58 and the bolts 30.

Each bolt 30 is set to a predetermined fastening torque value so that rotation prevention torque based on friction force resulting from the fastening force of the bolt group 301 is a value greater than torque applied to the support shaft 58 from the main shaft 9 by processing force that is the reaction force from the workpiece; and so that, when the external force that causes the spindle 10 to deform beyond the permissible range is applied to the spindle 10, the rotation prevention torque is a value smaller than the torque applied to the support shaft 58 from the main shaft 9, that is, the torque generated at the connection sections of the main shaft 9 and the drive-side fitting shaft 7 if it is assumed that the external force that causes the spindle 10 to deform beyond the permissible range is applied to the spindle 10. The predetermined fastening torque value of each bolt 30, that is a proper fastening torque value thereof is set on the basis of calculation or experiment in which the spindle 10 is actually rotated at a predetermined speed, the spindle 10 is made to collide with a sample, and the amount of deformation of the spindle 10 is examined.

When, during the rotation of the spindle 10, the spindle 10 or a tool collides with, for example, a processing jig, the support shaft motor 56 is subjected to emergency braking. When a collision force, that is, an external force causes a torque that is greater than the rotation prevention torque based on the friction force resulting from the fastening force of the bolt group 301 is applied to the connection sections of the main shaft 9 and the drive-side fitting shaft 7 serving as the two rotating members, the rotation cannot be transmitted, thereby causing the main shaft 9 and the drive-side fitting shaft 7 to rotate relative to each other. Here, kinetic friction force acts between the main shaft 9 and the drive-side fitting shaft 7, and collision energy is absorbed. When, while the relative rotation occurs within a range of a gap between the bolt insertion holes of the support shaft 58 (that is, the bolt insertion holes of the drive-side fitting shaft 7 and the bearing holder 14) and the bolts 30, the collision energy is absorbed by the friction force acting between the main shaft 9 and the drive-side fitting shaft 7, and the torque based on the external force becomes less than the rotation prevention torque based on the kinetic friction force between the main shaft 9 and the drive-side fitting shaft 7, the relative rotation occurs within the gap. When the collision energy is high and the torque based on the external force in the relative rotation within the range of the gap does not become less than the rotation prevention torque based on the kinetic friction force, the inner surfaces of the bolt insertion holes of the drive-side fitting shaft 7 and the bearing holder 14 contact the bolts 30, so that shearing force is generated at the bolts 30. This causes the bolts 30 to undergo elastic deformation or, depending upon circumstances, plastic deformation. However, when force applied to the spindle 10 as reaction force from the bolts 30 does not become equal to a force that consequentially causes the deformation beyond the permissible range, the spindle 10 is prevented from becoming deformed beyond the permissible range. When the collision energy is even higher and the force applied to the spindle 10 as the reaction force from the bolts 30 becomes consequentially equal to the force that causes the deformation beyond the permissible range, the spindle 10 is deformed. However, the present invention makes it possible to considerably reduce the frequency with which the deformation beyond the permissible range occurs.

The bolt group 321 that fastens the drive-side fitting shaft 7 and the rotor 13 to each other is positioned outwardly of the bolt group 301 (fastening the main shaft 9 and the drive-side fitting shaft 7) in the radial direction of the drive-side fitting shaft 7, and has a larger number of bolts than the bolt group 301. Each bolt 32 has the same nominal diameter as each bolt 30 as well as the same screw diameter and the same thread pitch as each bolt 30. Each bolt 32 is fastened by the same fastening torque value as each bolt 30 using, for example, a torque wrench. Therefore, when rotation prevention torque based on the friction force between the drive-side fitting shaft 7 and the rotor 13 resulting from the fastening becomes greater than the rotation prevention torque based on the friction force between the main shaft 9 and the drive-side fitting shaft 7 resulting from the fastening, and the spindle 10 or a tool collides with, for example, a processing jig during the rotation of the spindle 10, the relative rotation between the drive-side fitting shaft 7 and the rotor 13 is reliably prevented from occurring even if the relative rotation between the main shaft 9 and the drive-side fitting shaft 7 occurs. Accordingly, the two rotating members that rotate relative to each other during a collision accident can be specified as being the main shaft 9 and the drive-side fitting shaft 7. Therefore, a recovery operation of the collision accident is easily performed. In the embodiment, a rotary joint body 17 is secured to the support stud 5 with a bolt 45. The outer peripheral surface of the rotary joint body 17 faces the inner peripheral surface of the bearing holder 14, and the rotary joint body 17 and the bearing holder 14 constitute a rotary joint. Through the rotary joint, for example, tool chucking pressure fluid, processing liquid, or cooling cleaning liquid is supplied to the spindle 10 from the outside. As shown in FIGS. 2 and 5, the rotary joint body 17 according to the embodiment has through holes (which allow the bolts 30 to be mounted and removed) in a mounting flange for mounting to the support stud 5 in correspondence with the bolt group 301. It is possible to perform the recovery operation of the collision accident without disassembling the rotary joint. Here, any deformed bolt 30 is replaced depending upon circumstances.

In the embodiment, when the spindle 10 or a tool collides with, for example, a processing jig during the rotation of the spindle 10, the main shaft 9 and the drive-side fitting shaft 7 rotate relative to each other. However, the drive-side fitting shaft 7 and the rotor 13 may be made to rotate relative to each other. This is advantageous in that a recovery operation of the relative rotation between the drive-side fitting shaft 7 and the rotor 13 is easily performed. In this case, the rotation prevention torque based on the friction force resulting from fastening the drive-side fitting shaft 7 and the rotor 13 to each other is set smaller than the torque applied to the connection sections of the drive-side fitting shaft 7 and the rotor 13 when the external force that causes the spindle 10 to become deformed beyond the permissible range is applied to the spindle 10.

In the embodiment, the main shaft 9 and the support shaft 58 are fastened to each other as two rotating members according to the present invention through the bolt group 301. In addition, the support shaft 58 and the rotor 13 of the support shaft motor 56 are fastened to each other as different two rotating members through the bolt group 321. Further, the support shaft 58 is driven by an internal motor, the support shaft 58 itself serving as a rotary shaft thereof. However, the support shaft 58 may be driven through a rotation transmission mechanism (such as a gear, a pulley and a belt, or a coupling) by being connected to a rotary shaft of a motor including, for example, a rotary shaft parallel to the axis of the support shaft 58 or a rotary shaft positioned on an extension line. Two rotating members constituting the rotation transmission mechanism are provided between the support shaft 58 and the rotary shaft of such a motor, and are fastened to each other through a bolt group including a plurality of bolts. If the two rotating members are fastened to each other so that rotation prevention torque based on the friction force resulting from fastening the bolt group 301 becomes greater than the rotation prevention torque based on the friction force resulting from fastening the bolt group 301, the main shaft 9 and the support shaft 58 rotate relative to each other as in the embodiment when a collision accident occurs in rotating the spindle 10. If the two rotating members are fastened to each other so that the rotation prevention torque based on the friction force resulting from fastening the bolt group becomes smaller, the two rotating members rotate relative to each other. Although the support shaft 58 is fastened to the main shaft 9 through the bolt group 301, it may be joined to the main shaft 9 by, for example, welding instead of by using bolts. In this case, the support shaft 58 and the rotary shaft of the motor are connected to each other through two rotating members that are fastened to each other by a predetermined fastening force by a bolt group.

While maintaining the spindle 10 at a rotation position by moving the clamping device 57, a tool is moved to, for example, a processing position or a standby position. Therefore, when the spindle 10 or a tool collides with, for example, a processing jig or a workpiece due to, for example, a programming error during the movement of the spindle head 50 caused by the ram 1 or the head motor 2 or the movement of a processing table on which a workpiece is placed, the main shaft 9 and the support shaft 58 rotate relative to each other, that is, sliding occurs. The controlling device for the machine tool performs an emergency braking operation on the ram 1, the head motor 2, or the processing table by detecting relative rotation between the main shaft 9 and the support shaft 59.

As shown in FIG. 3, the bolts 31 that fasten the main shaft 9 and the driven-side fitting shaft 8 to each other are provided at an equal interval along a circumferential direction around an axial center of the driven-side fitting shaft 8 as center. The bolts 31 constitute the bolt group 311. The bolts 33 that fasten the driven-side fitting shaft 8 and the clamp ring 21 to each other are provided at an equal interval along the circumferential direction around the axial center of the driven-side fitting shaft 8 as center. The bolts 33 constitute a different bolt group 331. Each bolt 31 constituting the bolt group 311 is fastened by a predetermined fastening torque value using, for example, a torque wrench. The main shaft 9 and the driven-side fitting shaft 8 are fastened to each other at connection sections using the plurality of bolts 31. Push force at peripheral portions of the bolts 31 at the flat surface 9*d* of the main shaft 9 and the flat surface 8*b* of the driven-side fitting shaft 8 becomes a predetermined value, so that they are fastened to each other by a predetermined fastening force at the connection sections. Friction force where the flat surface 9*d* and the flat surface 8*b* contact each other is a value resulting from multiplying the friction coefficient between the flat surface 9*d* and the flat surface 8*b* to the fastening force. Force that prevents relative rotation between the main shaft 9 and the support shaft 59 at a very small contact surface where the flat surface 9*d* and the flat surface 8*b* contact each other, that is, a rotation prevention torque is a value resulting from multiplying the distance between the very small contact surface and the axial center of the support shaft 59 to the friction force for each very small contact surface. Rotation prevention torque at the entire contact surface where the flat surface 9*c* and the flat surface 8*b* contact each other is equal to the total sum of the rotation prevention torque of each very small contact surface. Since the push force is greatest at the peripheral portion near each bolt 31, the friction force is greatest at the peripheral portion near each bolt 31. Therefore, a rotation prevention torque at the peripheral portion near each bolt 31 accounts for a large portion of the rotation prevention torque at the entire connection sections. Therefore, the rotation prevention torque at the connection sections is a value resulting from multiplying the number of bolts 31 to the fastening force of the bolts 31. That is, it can be approximately obtained by multiplying the fastening force of the bolt group 311, the friction coefficient between the flat surface 9*d* and the flat surface 8*b*, and the distance between the axial center of the support shaft 59 and the bolts 31.

Each bolt 31 is set to a predetermined fastening torque value so that the rotation prevention torque based on the friction force resulting from the fastening force of the bolt group 311 is a value greater than the torque applied to the support shaft 58 from the main shaft 9 by processing force that is the reaction force from the workpiece; and so that, when, during the operation of the clamping device 57, the external force that causes the spindle 10 to deform beyond the permissible range is applied to the spindle 10, the rotation prevention torque is a value smaller than the torque applied to the support shaft 59 from the main shaft 9, that is, the torque generated at the connection sections of the main shaft 9 and the drive-side fitting shaft 7 if it is assumed that the external force that causes the spindle 10 to deform beyond the permissible range is applied to the spindle 10. The predetermined fastening torque value of each bolt 31, that is a proper fastening torque value thereof is set on the basis of calculation or experiment in which the ram 1 is actually moved at a predetermined speed, the spindle 10 is made to collide with a sample, and the amount of deformation of the spindle 10 is examined.

When, during the rotation of the clamping device 57, the spindle 10 or a tool collides with, for example, a processing jig, the ram 1 or the head motor 2 is subjected to emergency braking. When a collision force, that is, an external force causes a torque that is greater than the rotation prevention torque based on the friction force resulting from the fastening force of the bolt group 311 to be applied to the main shaft 9 and the driven-side fitting shaft 8 constituting the connection sections, the main shaft 9 and the driven-side fitting shaft 8 rotate relative to each other. Here, kinetic friction force acts between the main shaft 9 and the driven-side fitting shaft 8, and collision energy is absorbed. When, while the relative rotation occurs within a range of a gap between the bolt insertion holes of the support shaft 59 (that is, the bolt insertion holes of the driven-side fitting shaft 8 and the bearing holder 23) and the bolts 31, the collision energy is absorbed by the friction force acting between the main shaft 9 and the driven-side fitting shaft 8, and the torque based on the external force becomes less than the rotation prevention torque based on the kinetic friction force between the main shaft 9 and the driven-side fitting shaft 8, the relative rotation occurs within the gap. When the collision energy is high and the torque based on the external force in the relative rotation within the range of the gap does not become less than the rotation prevention torque based on the kinetic friction force, the inner surfaces of the bolt insertion holes of the driven-side fitting shaft 8 and the bearing holder 23 contact the bolts 31, so that shearing force is generated at the bolts 31. This causes the bolts 31 to undergo elastic deformation or, depending upon circumstances, plastic deformation. However, when force applied to the spindle 10 as reaction force from the bolts 31 does not become equal to a force that consequentially causes the deformation beyond the permissible range, the spindle 10 is prevented from becoming deformed beyond the permissible range. When the collision energy is even higher and the force applied to the spindle 10 as the reaction force from the bolts 31 becomes consequentially equal to the force that causes the deformation beyond the permissible range, the spindle 10 is deformed. However, the present invention makes it possible to considerably reduce the frequency with which the deformation beyond the permissible range occurs.

The bolt group 331 that fastens the driven-side fitting shaft 8 and the clamp ring 21 to each other is positioned outwardly of the bolt group 311 (fastening the main shaft 9 and the driven-side fitting shaft 8) in the radial direction of the driven-side fitting shaft 8, and has a larger number of bolts than the bolt group 311. Each bolt 33 has the same nominal diameter as each bolt 31 as well as the same screw diameter and the same thread pitch as each bolt 31. Each bolt 33 is fastened with the same fastening torque value as each bolt 31 using, for example, a torque wrench. Therefore, when the rotation prevention torque based on the friction force between the driven-side fitting shaft 8 and the clamp ring 21 resulting from the fastening becomes greater than the rotation prevention torque based on the friction force between the main shaft 9 and the driven-side fitting shaft 8 resulting from the fastening, and the spindle 10 or a tool collides with, for example, a processing jig during the operation of the clamping device 57, the relative rotation between the driven-side fitting shaft 8 and the clamp ring 21 is reliably prevented from occurring even if the relative rotation between the main shaft 9 and the driven-side fitting shaft 8 occurs. Accordingly, the two rotating members that rotate relative to each other during a collision accident can be specified as being the main shaft 9 and the driven-side fitting shaft 8. Therefore, a recovery operation of the collision accident is easily performed.

In the embodiment, when the spindle 10 or a tool collides with, for example, a processing jig during the rotation of the clamping device 57, the main shaft 9 and the driven-side fitting shaft 8 rotate relative to each other. However, the driven-side fitting shaft 8 and the clamp ring 21 may be made to rotate relative to each other. This is advantageous in that a recovery operation of the relative rotation between the driven-side fitting shaft 8 and the clamp ring 21 is easily performed. In this case, the rotation prevention torque based on the friction force resulting from fastening the driven-side fitting shaft 8 and the clamp ring 21 to each other is set smaller than the torque applied to the connection sections of the driven-side fitting shaft 8 and the clamp ring 21 when the external force that causes the spindle 10 to become deformed beyond the permissible range is applied to the spindle 10.

In the embodiment, the main shaft 9 and the support shaft 59 are fastened to each other as two rotating members according to the present invention through the bolt group 311. In addition, the support shaft 59 and the clamp ring 21 at the clamping device 37 are fastened to each other as different two rotating members through the bolt group 331. However, the support shaft 59 and the clamp ring 21 may be connected to each other through an intermediate member that is disposed on an extension line of the support shaft 59 or at the outer side of the support shaft 59 and that is coaxial with the driven-side fitting shaft 8. In this case, the intermediate member and the support shaft 59 are joined to each other by, for example, fastening them through bolts or welding them. If they are fastened to each other through bolts, they constitute two rotating members according to the present invention. If the intermediate member and the support shaft 59 are fastened to each other so that the rotation prevention torque based on the friction force resulting from the fastening becomes greater than the rotation prevention torque based on the friction force resulting from fastening the bolt group 311 as in the fastening of the intermediate member and the clamp ring 21 to each other by the bolt group 331, the main shaft 9 and the support shaft 59 rotate relative to each other as in the embodiment when a collision accident occurs. If the intermediate member and the support shaft 59 are fastened to each other so that the rotation prevention torque based on friction force resulting from the fastening becomes smaller, the intermediate member and the support shaft 59 rotate relative to each other. Although the support shaft 59 is fastened to the main shaft 9 through the bolt group 311, it may be joined to the main shaft 9 by, for example, welding instead of by using bolts. In this case, when the support shaft 59 and the clamp ring 21 are provided with intermediate members, the support shaft 59 and the intermediate member or the intermediate member and the support shaft 59 are fastened to each other by a predetermined fastening force by a bolt group, and rotate relative to each other during a collision accident.

In the spindle head 50, if the support stud 5 or the support stud 6 collides with, for example a processing jig or a workpiece during the movement of the ram 1, relative movement occurs between the frame 4 and the support stud 5 or the frame 4 and the support stud 6. In the embodiment, when performing a recovery operation of such a collision accident, the positioning of the frame 4 and the support stud 5 and the positioning of the frame 4 and the support stud 6 in the spindle head 50 are performed with a tapered pin 26.

In the recovery operation, the bolt 34 fastening the head holder 3 and the frame 4 to each other is removed, and the spindle head 50 is removed from the head motor 2. FIG. 6 is an illustration corresponding to FIG. 2, and shows the upper portion of the spindle head 50 that is removed from the head motor 2.

With the bolts 44 being loosened or removed, as shown on the left side in FIG. 6, the tapered pin 26 is inserted into a tapered hole 4a of the frame 4 and a tapered hole 5a provided in the support stud 5 connected to the tapered hole 4a. An internal thread 5b (having a nominal diameter of 8 mm in the embodiment) is provided at the bottom portion of the tapered hole 5a, and an internal thread 26a having a nominal diameter (10 mm in the embodiment) that is greater than that of the internal thread 5b and extending through an axial line is provided in the tapered pin 26. Using a bar-shaped spanner having a hexagonal shape in cross section, a press-fit bolt 46 (having a nominal diameter of 8 mm), which is a hexagon socket head bolt, is screwed into the internal thread 5b by passing it through the internal thread 26a of the tapered pin 26. By the screwing operation, the head of the press-fit bolt 46 is pushed against an end portion of the tapered pin 26, and the tapered pin 26 is press-fitted to the tapered hole 4a and the tapered hole 5a, so that the frame 4 and the support stud 5 are precisely positioned to a position before relative rotation occurs. After press-fitting two of the tapered pins 26, the bolts 44 are mounted to fasten the frame 4 and the support stud 5 to each other. The positioning of the frame 4 and the support stud 6 are also similarly performed. After inserting the tapered pin 26 into a tapered hole 4a and a tapered hole 6a of the support stud 6, a press-fit bolt 46 is screwed into an internal thread 6b at the bottom portion of the tapered hole 6a to press-fit the tapered pin 26.

The tapered pins 26 may be kept mounted to the tapered holes 4a, 5a, and 6a. However, if the tapered pins 26 are kept mounted, the aforementioned collision accident between the support stud 5 or the support stud 6 and, for example, a processing tool or a workpiece may cause damage to the tapered pins 26 and the tapered holes 4a, 5a, and 6a. In particular, if the tapered holes 4a, 5a, and 6a are damaged, it becomes difficult to perform the aforementioned positioning operations in the recovery operation of the collision accident. Since the tapered pins 26 are mounted, impact force applied to the spindle head 50, the ram 1, the driving device of the ram 1, and the head motor 2 becomes correspondingly large, thereby damaging them more seriously. Therefore, in the embodiment, after fastening the frame 4 and the support stud 5 to each other and after fastening the frame 4 and the support stud 6 to each other, the tapered pins 26 are removed. As shown on the right side of FIG. 6, each mounting bolt 47 is screwed into its internal thread 26a extending through its tapered pin 26, and an end of each mounting bolt 47 is made to reach the bottom portion of each of the tapered holes 5a and 6a. Further, the mounting bolts 47 are screwed in to push the bottom portions of the tapered holes 5a and 6a. An axial force, which is a reaction force resulting from the pushing of the bottom portions, acts upon the tapered pins 26 through the mounting bolts 47.

Therefore, the tapered pins 26 move in the axial direction, and can be removed as the press-fitting state is canceled by the screwing force.

In the embodiment, tapered pins 26 are also used for positioning the main shaft 9 and the drive-side fitting shaft 7 and the positioning of the main shaft 9 and the driven-side fitting shaft 8.

As shown in FIG. 5, a tapered hole 7d is provided in the drive-side fitting shaft 7, and a tapered hole 9g is provided in the main shaft 9 so as to be connected to the tapered hole 7d. An internal thread 9h (having a nominal diameter of 8 mm in the embodiment) is provided in the bottom portion of the tapered hole 9. As shown in FIGS. 2 and 5, through holes for mounting and removing the tapered pins 26 are formed in the bearing holder 14 and the rotary joint body 17 in correspondence with the tapered holes 9g and 7d. In performing the positioning, a tapered pin 26 is inserted into the tapered holes 7d and 9g, and a hexagon socket head bolt is passed through an internal thread 26a of the tapered pin 26 and is screwed into the internal thread 9h to press-fit the tapered pin 26. After the positioning, the main shaft 9 and the drive-side fitting shaft 7 are fastened to each other by the bolt group 301. After fastening the main shaft 9 and the drive-side fitting shaft 7 to each other with the bolt group 301, the tapered pin 26 may be kept mounted. However, after fastening them with the bolt group 301, a bolt is screwed into the internal thread 26a of the tapered pin 26 to remove the tapered pin 26. The positioning of the main shaft 9 and the driven-side fitting shaft 8 is similarly carried out using a tapered pin 26. The tapered pin 26 is inserted into a tapered hole 8c of the driven-side fitting shaft 8 and a tapered hole 9g of the main shaft 9. A hexagon socket head bolt is passed through an internal thread 26a of the tapered pin 26 and is screwed into the internal thread 9h to press-fit the tapered pin 26. After the fastening using the bolt group 311, the tapered pin 26 is removed. In the embodiment, since, after the fastening, the tapered pin 26 is removed in this way, even if an interference accident in which the spindle 10 and a tool collides with, for example, a processing tool or a workpiece occurs, it is possible to prevent damage to the tapered holes 7d, 8c, and 9g, and to precisely carry out the positioning in a recovery operation.

The embodiment can provide measures against collision accidents during the rotation of the spindle 10 and collision accidents during the operation of the clamping device 57. The main shaft 9 and the support shaft 58 and the main shaft 9 and the support shaft 58 are fastened to each other by a predetermined fastening force so that rotation prevention torque based on friction force resulting from the fastening is smaller than a torque applied to the connection sections by external force generated when the corresponding collision accident occurs. When a collision accident during the rotation of the spindle 10 occurs, the main shaft 9 and the support shaft 58 are allowed to rotate relative to each other. When a collision accident during the operation of the clamping device 57 occurs, the main shaft 9 and the support shaft 59 are allowed to rotate relative to each other. However, if there is no fear of collision accidents during the operation of the clamping device 57, the invention may provide measures only against collision accidents during the rotation of the spindle 10. In addition, if there is no fear of collision accidents during the rotation of the spindle 10, the invention may provide measures only against collision accidents during the operation of the clamping device 57. In the former case, the main shaft 9 and the support shaft 58 and in the latter case the main shaft 9 and the support shaft 59 are fastened to each other so that rotation prevention torque based on friction force by the fastening is at least greater than the torque applied to the connection sections during processing.

In the embodiment, the support shaft motor 56 and the clamping device 57 are, respectively, connected to the support shafts 58 and 59 provided on the respective sides of the main shaft 9. However, the support shaft motor 56 and the clamping device 57 may be connected to only one of the pair of support shafts 58 and 59 or to both of them. It is possible to connect the support shaft motor 56 to both of the pair of support shafts 58 and 59, and to connect the clamping device 57 to only one of the pair of support shafts 58 and 59. In order for the support shafts connected to the support shaft motor 56 and the clamping device 57 to rotate relative to the main shaft 9 during a collision accident to restrict deformation of the spindle 10 to the permissible range, the main shaft 9 and the support shafts are such that the fastening forces of the bolt groups are set so that rotation prevention torque based on friction force resulting from the fastening is smaller than a smaller one of torque resulting from external force generated when a collision accident during the rotation of the spindle 10 occurs and torque resulting from external force generated when a collision accident during the operation of the clamping device 57 occurs.

The present invention is not limited to the above-described embodiments, so that various modifications can be made without departing from the scope of the claims in the present invention.

The invention claimed is:

1. A spindle head for a machine tool, the spindle head including a main shaft (9) that rotatably supports a spindle (10) to which a tool is mounted; a pair of support shafts (58, 59) including coaxial axial lines which intersect the main shaft (9), the pair of support shafts (58, 59) being provided on respective sides of the main shaft (9) and being secured to the main shaft (9); a frame (4) that rotatably supports the pair of support shafts (58, 59); and a rotation driving device (56) for at least one of the pair of support shafts (58, 59), in which the spindle (10) is rotated around the axial lines of the support shafts (58, 59) by the rotation driving device (56), wherein two rotating members (9, 58) that form a rotation transmission mechanism for rotating the spindle (10) and that transmit drive force of the rotation driving device (56) are fastened to each other at respective connection sections thereof by a bolt group (301) and are connected to each other so as to be prevented from rotating relative to each other by friction force resulting from the fastening, and wherein rotation prevention torque based on the friction force is a value greater than torque applied to the connection sections during processing and smaller than torque applied to the connection sections when external force that causes the spindle (10) to deform beyond a permissible range during the rotation of the spindle (10) is applied to the spindle (10).

2. The spindle head for the machine tool according to claim 1, wherein the main shaft (9) and the support shaft (58) driven by the rotation driving device (56) are fitted to each other to form the two rotating members (9, 58), and are fastened to each other by a predetermined fastening force with the bolt group (301).

3. The spindle head for the machine tool according to claim 2, wherein the rotation driving device (56) includes a motor including a rotor (13), provided at the support shaft (58), and a stator (12), provided at the frame (4) so as to face the rotor (13); and wherein the rotor (13) is fastened to the support shaft (58) by a fastening force that is greater than the predetermined fastening force using a different bolt group (321) positioned outwardly of the bolt group (301) in a radial direction of the support shaft (58).

4. The spindle head for the machine tool according to any one of claims 1 to 3, comprising a clamping device (57) and connection sections, the clamping device (57) being disposed around the axial line of the support shaft (59) and including a push member (19, 20) for maintaining a rotation position of the spindle (10) by directly or indirectly acting upon the support shaft (59), the connection sections being provided coaxially with the axial line of the support shaft (59) from an acting position of the push member (19, 20) to the main shaft (9) at the axial line of the support shaft (59), the connection sections being fastened to each other by a bolt group (311), the connection sections being connected to each other so as to be prevented from rotating relative to each other by friction force resulting from the fastening, wherein rotation prevention torque based on the friction force is a value greater than torque applied to the connection sections during processing and smaller than torque applied to the connection sections when the external force that causes the spindle (10) to deform beyond the permissible range during operation of the clamping device (57) is applied to the spindle (10).

5. The spindle head for the machine tool according to claim 4, wherein the main shaft (9) and the support shaft (59) upon which the push member (19, 20) acts are fitted to each other to form the connection sections, and are fastened to each other by a predetermined fastening force with the bolt group (311).

6. The spindle head for the machine tool according to claim 5, wherein the clamping device (57) includes a braking member (21) facing the push member (19, 20), the braking member (21) being fastened to the support shaft (59) by a fastening force that is greater than the predetermined fastening force with a different bolt group (331) positioned outwardly of the bolt group (311) in a radial direction of the support shaft (59).

7. A spindle head for a machine tool, the spindle head including a main shaft (9) that rotatably supports a spindle (10) to which a tool is mounted; a pair of support shafts (58, 59) including coaxial axial lines which intersect the main shaft (9), the pair of support shafts (58, 59) being provided on respective sides of the main shaft (9) and being secured to the main shaft; a frame (4) that rotatably supports the pair of support shafts (9); and a rotation driving device (56) for at least one of the pair of support shafts (58, 59), in which the spindle (10) is rotated around the axial lines of the support shafts (9) by the rotation driving device (56), wherein the spindle head comprises a clamping device (57) and connection sections, the clamping device (57) being disposed around the axial line of the support shaft (59) and including a push member (19, 20) for maintaining a rotation position of the spindle (10) by directly or indirectly acting upon the support shaft (59), the connection sections being provided coaxially with the axial line of the support shaft (59) from an acting position of the push member (19, 20) to the main shaft (9) at the axial line of the support shaft (59), the connection sections being fastened to each other by a bolt group (311), the connection sections being connected to each other so as to be prevented from rotating relative to each other by friction force resulting from the fastening, wherein rotation prevention torque based on the friction force is a value greater than torque applied to the connection sections during processing and smaller than torque applied to the connection sections when an external force that causes the spindle (10) to deform beyond a permissible range during operation of the clamping device (57) is applied to the spindle (10).

8. The spindle head for the machine tool according to claim 7, wherein the main shaft (9) and the support shaft (59) upon which the push member (19, 20) acts are fitted to each other to form the connection sections, and are fastened to each other by a predetermined fastening force with the bolt group (311).

9. The spindle head for the machine tool according to claim 8, wherein the clamping device (57) includes a braking member (21) facing the push member (19, 20), the braking member (21) being fastened to the support shaft (59) by a fastening force that is greater than the predetermined fastening force with a different bolt group (331) positioned outwardly of the bolt group (311) in a radial direction of the support shaft (59).

\* \* \* \* \*